United States Patent
Henry et al.

(10) Patent No.: US 12,405,344 B2
(45) Date of Patent: Sep. 2, 2025

(54) CLUSTER FORMATION FOR ULTRA-WIDEBAND TIME-DIFFERENCE-OF-ARRIVAL NETWORKS

(71) Applicant: Cisco Technology, Inc., San Jose, CA (US)

(72) Inventors: Jerome Henry, Pittsboro, NC (US); Robert E. Barton, Richmond (CA); Indermeet Singh Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 381 days.

(21) Appl. No.: 17/823,794

(22) Filed: Aug. 31, 2022

(65) Prior Publication Data
US 2024/0069141 A1  Feb. 29, 2024

(51) Int. Cl.
*G01S 5/02* (2010.01)

(52) U.S. Cl.
CPC ........ *G01S 5/02216* (2020.05); *G01S 5/0215* (2013.01); *G01S 5/0278* (2013.01)

(58) Field of Classification Search
None
See application file for complete search history.

(56) References Cited

U.S. PATENT DOCUMENTS

| | | |
|---|---|---|
| 2016/0345242 A1 | 11/2016 | Kim et al. |
| 2017/0195109 A1 | 7/2017 | Perez-Cruz et al. |
| 2020/0137702 A1 | 4/2020 | Patil et al. |
| 2020/0287590 A1 | 9/2020 | Torborg |
| 2020/0351627 A1 | 11/2020 | Gherardi et al. |
| 2021/0103023 A1 | 4/2021 | Al-Kadi et al. |
| 2022/0070612 A1 | 3/2022 | Henry et al. |
| 2022/0070816 A1 | 3/2022 | Henry et al. |
| 2022/0216892 A1 | 7/2022 | Bollard |
| 2023/0217211 A1* | 7/2023 | Duan ............ H04W 4/023 370/329 |

OTHER PUBLICATIONS

Vashistha, Ankush, "Self Calibration of the Anchor nodes for UWB-IR TDOA based Indoor positioning System" Researchgate, Feb. 2018 (7 pgs).

* cited by examiner

*Primary Examiner* — Whitney Moore
(74) *Attorney, Agent, or Firm* — Merchant & Gould P.C.

(57) ABSTRACT

Cluster formation for networks for Ultra-Wideband (UWB) Time-Difference-of-Arrival (TDoA) networks may be provided. A plurality of anchors may be set to a primary setting. Synchronization messages may then be broadcast by the plurality of anchors. Then the plurality of anchors may send responses to the synchronization messages. A room consensus may be performed to determine probabilities of obstacles between the plurality of anchors. The plurality of anchors may then send proposals of one or more clusters based on the room consensus. One or more clusters may be formed by the plurality of anchors based on the proposals.

20 Claims, 5 Drawing Sheets

CLUSTER FORMATION FOR ULTRA-WIDEBAND TIME-DIFFERENCE-OF-ARRIVAL NETWORKS

TECHNICAL FIELD

The present disclosure relates generally to providing cluster formation for networks, particularly Ultra-Wideband (UWB) Time-Difference-of-Arrival (TDoA) networks.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
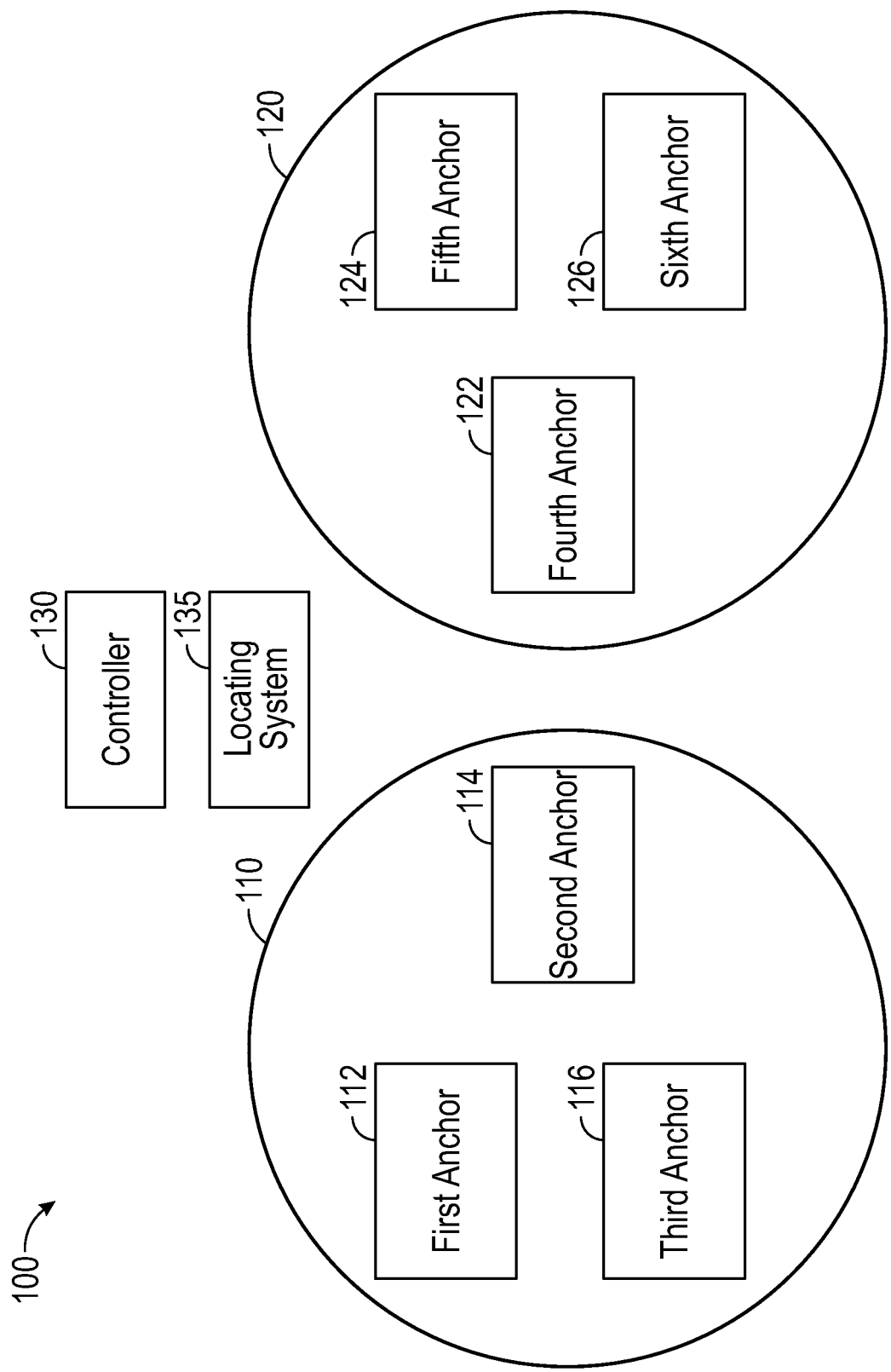
FIG. 1 is a block diagram of an operating environment for providing cluster formation for networks.

Cluster formation for networks for Ultra-Wideband (UWB) Time-Difference-of-Arrival (TDoA) networks may be provided. A plurality of anchors may be set to a primary setting. Synchronization messages may then be broadcast by the plurality of anchors. Then the plurality of anchors may send responses to the synchronization messages. A room consensus may be performed to determine probabilities of obstacles between the plurality of anchors. The plurality of anchors may then send proposals of one or more clusters based on the room consensus. One or more clusters may be formed by the plurality of anchors based on the proposals.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A UWB TDoA network may comprise clusters of anchors. The anchors may be Access Points (AP), base stations, readers, and the like. Each cluster may be configured and managed as a single entity. The UWB TDoA network may be used for location estimation. To provide location estimation services, the anchors may exchange synchronization messages so the anchors may synchronize their clocks. The anchors may also create, and track timestamps associated with when messages are sent and when messages are received. A Station (STA) or some other device that is utilizing the location estimation services may use the timestamps and the time of arrival of messages sent by the anchors of the clusters to compute the distance to each anchor. The STA may use the computed distance to each anchor to determine its location.

Cluster formation may present challenges. For example, obstacles and distances that may cause communications to be interfered with or prevented may be considered to allow anchors determined to be in a cluster to communicate with the other anchors in its cluster. Accordingly, embodiments of the disclosure may determine how clusters may be formed for a network.

FIG. 1 is a block diagram of an operating environment 100 for providing cluster formation for networks. The operating environment 100 may include a first cluster 110 that may include a first anchor 112, a second anchor 114, and a third anchor 116, a second cluster 120 that may include a fourth anchor 122, a fifth anchor 124, and a sixth anchor 126, a controller 130, and a locating system 135. The controller 130 may coordinate or otherwise control the formation of clusters, including the first cluster 110 and the second cluster 120, and other operations related to the operation of the network. The controller 130 may be local to the anchors in the operating environment 100 or may be remote. For example, the anchors in the operating environment 100 may communicate with the controller 130 via a network when the controller is remote.

The first cluster 110 and the second cluster 120 may be formed by first setting, by the controller 130 or the anchors themselves for example, each anchor in the operating environment 100 to a primary setting. Next, the anchors (the first anchor 112, the second anchor 114, the third anchor 116, the fourth anchor 122, the fifth anchor 124, and the sixth anchor 126) may begin broadcasting synchronization messages that may include a cluster index. Each cluster index may include an initial value set to indicate that the cluster is temporary. The anchors of other clusters may respond to the synchronization messages, and the responses may confirm which cluster the anchor is a member of, information related to the cluster the anchor is a member of, and the like. Because the anchors may be set to the primary mode and/or the cluster indexes may be set to the initial value, each anchor may respond to all other detected anchor messages, including the synchronization messages for example.

The broadcasted synchronization messages and/or responses may result in collisions with random backoffs, for example, because of several data streams originating from multiple nodes (e.g., anchors) that are being transferred through a multi-point transmission channel. Therefore, the anchors (the first anchor 112, the second anchor 114, the third anchor 116, the fourth anchor 122, the fifth anchor 124, and the sixth anchor 126) may repeat the synchronization message transmission process multiple times. The anchors may detect the number of responders and then determine the probability of undetected anchors existing and the estimated number of undetected anchors. The anchors may repeat the synchronization message transmission process based on the determined probability of undetected anchors existing and the estimated number of undetected anchors. The anchors may also receive information about detected anchors from other detected anchors and adjust the number of times to repeat the synchronization message transmission process.

Cluster Formation in a Closed Space

In an example, the first cluster 110 may be formed because the first anchor 112, the second anchor 114, and the third anchor 116 may all be in same closed space. Similarly, the second cluster 120 may be formed because the fourth anchor 122, the fifth anchor 124, and the sixth anchor 126 may all be in same closed space. A closed space may be a space that is enclosed by obstacles, reflective surface, or other objects and/or properties that interfere with anchors communicating with each other.

When an anchor (e.g., the first anchor 112, the second anchor 114, the third anchor 116, the fourth anchor 122, the fifth anchor 124, and the sixth anchor 126) responds to a synchronization message, the response may include the signal strength at which the synchronization message was received. Thus, each anchor may determine the signal strength the anchor has when sending messages to other anchors. The anchor may then perform a room consensus to determine if there are obstacles between anchors. The room consensus may include determining a closed space defined by one or more obstacles and creating a cluster with anchors in the closed space. In another example, the controller 130 may receive the data from the anchors and perform the room consensus.

The room consensus may include performing a Free Path Loss (FPL) determination to detect the probability of an obstacle, such as a wall, between the anchor performing the room consensus and the other anchors that responded to the anchor's synchronization messages. Thus, the FPL determination may be performed to determine if anchors are in a same closed space, such as a room. The closed space may comprise multiple physical rooms sectioned by obstacles such as light walls, but these obstacles may be light or otherwise penetrable enough to allow cluster formation.

Once the anchors (the first anchor 112, the second anchor 114, the third anchor 116, the fourth anchor 122, the fifth anchor 124, and the sixth anchor 126) send synchronization messages, receive responses to the synchronization messages that include the signal strength of the received synchronization message, and/or report about other identified anchors, the anchors may perform the FPL determination. For example, the first anchor 112, the second anchor 114, and the third anchor 116 may all detect (e.g., receive a response to the synchronization messages) and report about each other (e.g., indicate that a response was received in a message to another anchor). In this example, the reported signal strength levels may be inserted into the FPL equation, and the FPL calculation may indicate that the first anchor 112, the second anchor 114, and the third anchor 116 are in the same closed space and the first cluster 110 may be formed. The FPL calculation may produce a triangle in Euclidean space, indicating that the anchors may be located in the same closed space and the first cluster 110 may be formed. The fourth anchor 122, the fifth anchor 124, and the sixth anchor 126 may undergo the same process when the second cluster 120 is formed.

Figure 2:
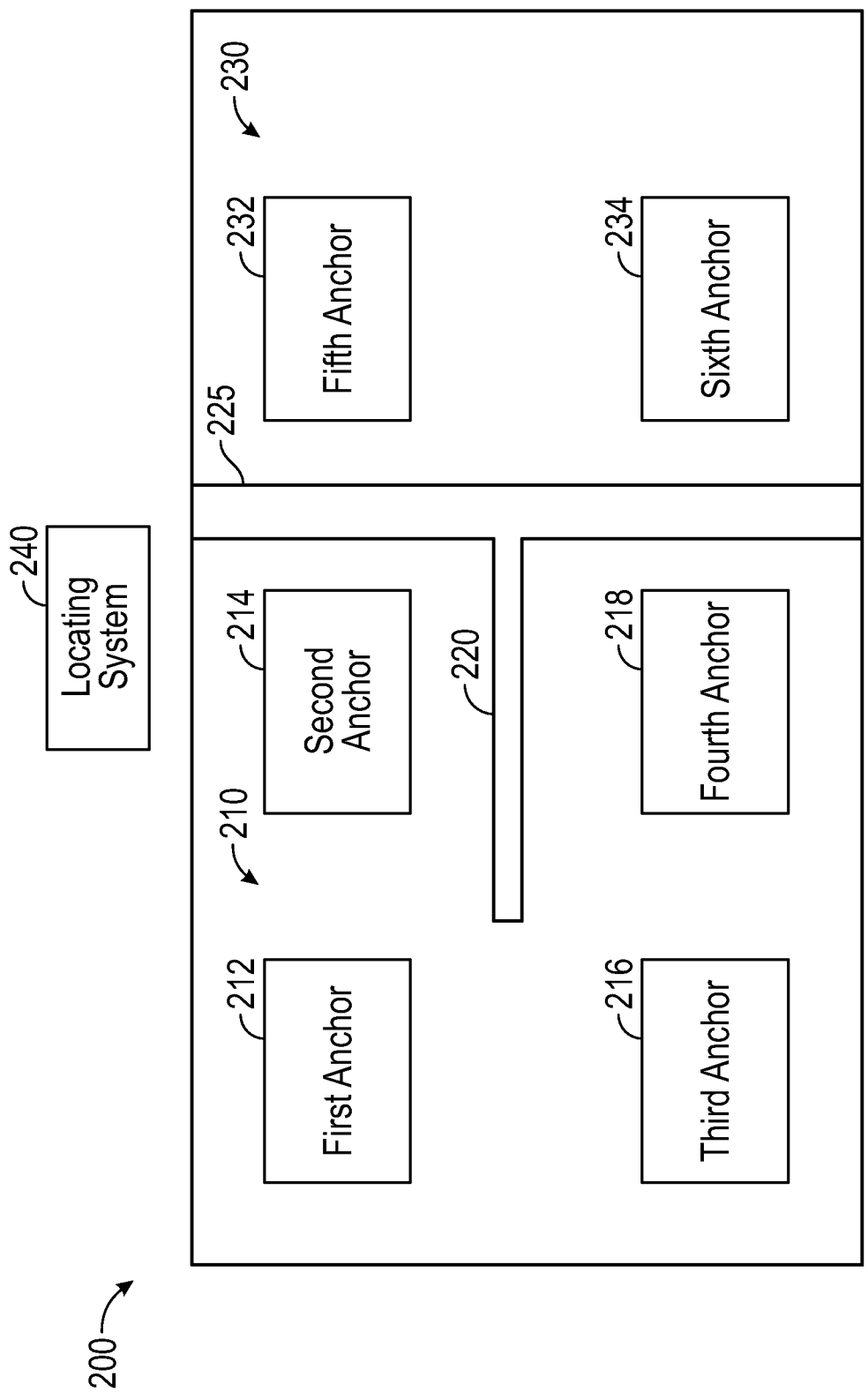
FIG. 2 is a block diagram of a closed space where cluster formation for networks may be performed.

FIG. 2 is a block diagram of a first closed space 200 where cluster formation for networks may be performed. A first anchor 212, a second anchor 214, a third anchor 216, and a fourth anchor 218 may all detect and report about each other. The first closed space 200 may include a second closed space 210 and a third closed space 230. The second closed space 210 and the third closed space 230 may both be rooms partitioned by a second obstacle 225, such as a wall. Once the reported signal strength levels are inserted into the FPL equation, the FPL calculation may indicate that the first anchor 212, the second anchor 214, the third anchor 216, and the fourth anchor 218 may all be in the same closed space (e.g., the second closed space 210). Thus, a cluster including the first anchor 212, the second anchor 214, the third anchor 216, and the fourth anchor 218 may be formed. The first obstacle 220 may be physically between the anchors, such as the second anchor 214 and the fourth anchor 218, but the first obstacle 220 may be light or otherwise penetrable enough to allow for the cluster to be formed.

Referring back to FIG. 1, in another example, the first anchor 112, the second anchor 114, and the fourth anchor 122 may all detect and report about each other. In this example, the reported signal strength levels may be inserted into the FPL equation, and the FPL calculation may indicate that the first anchor 112 and the fourth anchor 122 and/or the second anchor 114 and the fourth anchor 122 may not be in the same closed space. The FPL calculation may not be able produce a triangle in Euclidean space due to reflection off surfaces, obstacles, and the like. Thus, the FPL calculation may indicate that the anchors are not located in the same closed space. Thus, the first anchor 112 and the second anchor may be included in the same cluster, such as the first cluster 110, and the fourth anchor 122 may not be included in the first cluster 110. The same results may occur when the FPL calculation is performed for anchors that may not all be in the same closed space (e.g., the second anchor 114, the third anchor 116, and the fifth anchor 124; the fourth anchor 122, the sixth anchor 126, and the third anchor 116, etc.).

Referring back to FIG. 2, the second anchor 214, a fifth anchor 232, and a sixth anchor 234 may all detect and report about each other. The reported signal strength levels may be inserted into the FPL equation, and the FPL calculation may indicate that the second anchor 214 and the fifth anchor 232 and/or the second anchor 214 and the sixth anchor 234 may not be in the same closed space. The FPL calculation may not be able produce a triangle in Euclidean space due to reflection off surfaces, obstacles, such as the second obstacle 225, and the like. Thus, the FPL calculation may indicate that the anchors may not be located in the same closed space because of the second obstacle 225, and the second anchor 214, the fifth anchor 232, and the sixth anchor 234 may not be in the same cluster. The same results may occur between anchors in the second closed space 210 and the third closed space 230.

Referring back to FIG. 1, in another example, the first anchor 112 may detect and report to the second anchor 114, the second anchor 114 may detect and report to the first anchor 112 and the fourth anchor 122, and the fourth anchor 122 detect and report to the second anchor 114. Thus, an obstacle between the first anchor 112 and the fourth anchor 122 may be indicated because the first anchor 112 and the fourth anchor 122 may not report and detect to each other. Thus, the first anchor 112 and the fourth anchor 122 may not be included in the same cluster, such as the first cluster 110 or the second cluster 120. The reporting by the second anchor 114 may indicate to the first anchor 112 and the fourth anchor 122 that the anchors may be in the same cluster, but the lack of direct detection and reporting between the two anchors may indicate an obstacle that may not allow anchors to be in the same cluster. The same results may occur when the anchors do not report and detect the same anchors.

Referring back to FIG. 2, the fourth anchor 218 may detect and report to the sixth anchor 234, but not the fifth anchor 232, the fifth anchor 232 may detect and report to the sixth anchor 234, but not the fourth anchor 218, and the sixth anchor 234 may detect and report to the fourth anchor 218 and the fifth anchor 232. Thus, the fourth anchor 218 and the fifth anchor 232 may not report and detect to each other because of the second obstacle 225. The reporting by the sixth anchor 234 may indicate to the fourth anchor 218 and the fifth anchor 232 that the anchors may be in the same cluster, but the lack of direct detection and reporting between the two may indicate an obstacle that may not allow anchors to be in the same cluster. In another example, the fourth anchor 218 may detect and report to the third anchor 216, but not the second anchor 214, the second anchor 214 may detect and report to the third anchor 216, but not the fourth anchor 218, and the third anchor 216 may detect and report to the fourth anchor 218 and the second anchor 214. Thus, even though the second anchor 214 and the fourth anchor 218 may be in the second closed space 210, the first obstacle 220 may prevent the second anchor 214 and the fourth anchor 218 from being in the same cluster. Similar detecting and reporting issues between the other anchors in the first closed space 200 may be caused by the first obstacle 220 and/or the second obstacle 225.

Once it is determined which anchors are in the same closed space (e.g., based on the probabilities of obstacles being between two anchors), each anchor, in the response to each message from other anchors in the same closed space, may propose a cluster number. The responses may be pseudo random with collision detection. Other anchors may receive a proposal, agree to the proposal, and respond with the same cluster number in subsequent messages (e.g., synchronization messages, responses). The anchors may also record the messages and responses of other anchors and their cluster number proposal. Each anchor outside of a consensus (e.g., the fourth anchor 122 in FIG. 1 may not detect the first anchor 112, the second anchor 114, and the third anchor 116 proposing a same cluster number to each other) may arbitrate the conflict by proposing different cluster number values to their mutually non-detecting neighbors (e.g., the fifth anchor 124 and the sixth anchor 126). Anchors may then join the cluster signaled by another anchor with the highest message signal value.

The outcome of the cluster formation process may be to match the cluster boundaries with the building room structure (e.g., in FIG. 2 the first anchor 212, the second anchor 214, the third anchor 216, the fourth anchor 218 forming one cluster and the fifth anchor 232 and the sixth anchor 234 forming a second cluster). When the anchors in a same closed space are in the same cluster, the anchors may synchronize the clocks between anchors in the same cluster without interference from obstacles. Additionally, anchors that may be close to an obstacle and therefore on a physical edge of a cluster (e.g., in FIG. 2 the second anchor 214, the fourth anchor 218, the fifth anchor 232, and the sixth anchor 234 being located near the second obstacle 225) may be able to detect and respond to anchors in other clusters, such as the second anchor 214 and the fifth anchor 232 being able to communicate and the fourth anchor 218 and the sixth anchor 234 being able to communicate. Thus, the anchors close to the obstacle may communicate with anchors of other clusters through the obstacle to synchronize the anchors between clusters.

Once the clusters are formed, the locating system (e.g., the locating system 135 in FIG. 1 and the locating system 240 in FIG. 2) may obtain the position of each anchor and its cluster membership. The locating system may be a real-time locating system, and the locating system may be positioned at the same area of the anchors. The locating system may overlay or otherwise incorporate the positions of the anchors on a floorplan. The locating system may then determine the obstacles between clusters based on the cluster formation process and/or the floorplan. The locating system may determine transition paths between the obstacles and other boundaries between the clusters (e.g., doors, windows, openings).

When an STA uses the network for location estimation, the locating system may communicate the position of each anchor on the map to the STA. The locating system may also communicate cluster boundary positions to the STA. The location of the cluster boundary positions may be used to estimate the location of the STA. For example, if signals from a first cluster's anchors (e.g., the first cluster 110 in FIG. 1) decrease by more than a predetermined amount and signal from a second cluster's anchors (e.g., the second cluster 120 in FIG. 1) increase by more than predetermined amount, the STA may be at a position between the two clusters. For example, there may be at a door between a closed space that includes the anchors of the first cluster 110 and a closed space that includes the anchors of the second cluster 120. The signals the STA receives from the anchors in the first cluster 110 decrease by 10 dB or more, and the signals the STA receives from the anchors in the first cluster 110 increase by 10 dB or more. This may indicate the STA is moving from the close space that includes the anchors of the first cluster 110 to the closed space that includes the anchors of the second cluster 120 using the door. Thus, the STA may determine that the STA is moving from the range of the first cluster 110 to the range of the second cluster 120. Therefore, the clocks of the anchors of the first cluster 110 do not need to be synchronized with the clocks of the second cluster 120, because the STA may determine that the STA is in the range of the second cluster 120 and use the signals from the anchors of the second cluster 120 to determine its position.

For example, the STA may have been originally within the range of the anchors of the first cluster 110. Therefore, the STA may have used the signals from the anchors of the first cluster 110 to perform location estimation, and the clocks of the anchors of the first cluster 110 were synchronized. The STA may then determine that it has moved from the range of the anchors in the first cluster 110 to the range of the anchors in the second cluster 120 due to the signal increases and decreases respectively. Thus, the STA may then use the signals from the anchors of the second cluster 120 to perform further location estimation, and the clocks of the anchors of the second cluster 120 may be synchronized. The STA may therefore determine an accurate location estimation even if the clocks between clusters are not synchronized.

Cluster Formation in an Open Space

Anchors may also be positioned in open spaces. An open space may be a space that is large enough that anchors may be unable to or ineffectively communicate even with no obstacles between them due to distance. For example, referring again to FIG. 1, the first anchor 112, the second anchor 114, the third anchor 116, the fourth anchor 122, the fifth anchor 124, and the sixth anchor 126 may all be in the same open space.

Each anchor may be set with a signal threshold that may indicate whether an anchor should determine whether the anchor may be in a cluster with another anchor. When messages between anchors are above the threshold, the anchors may consider the respective anchor a neighbor. The threshold may be configurable, for example, by the controller 130. For example, the second anchor 114 may detect the fourth anchor 122, but the signal strength when communicating with the fourth anchor 122 may be below the signal threshold, indicating that the second anchor 114 and the fourth anchor 122 should not be in the same cluster. The fourth anchor 122 may also determine that the communications with the second anchor 114 are below its signal threshold or determine that the communications are above its signal threshold. When the anchors do not both determine that the anchors should not be in the same cluster (e.g., communications are below the second anchor's 112 signal threshold, but not below the fourth anchor's 122 signal threshold or communications between the second anchor 114 and the fourth anchor 122 are below the signal thresholds but another anchor has communications with the second anchor 114 and the fourth anchor 122 as above the signal thresholds), the anchors may perform delta margin and/or an agreement process to determine whether to be in the same cluster or not. Thus, the anchors may perform an agreement process between two anchors when communications between the two anchors are above the signal threshold of the first anchor and below the signal threshold of the second anchor. In another example, the anchors may determine to be in the same cluster only if the communications are above the signal thresholds of both anchors.

As the exchanges repeat (e.g., sending synchronization messages and responding), and as anchors answer to detected signals, the anchors may also detect which other anchors its neighbor (an anchor the anchor is communicating with) is in range of, and responding to. For example, the first anchor 112 may be in range of the second anchor 114 and receives a message from the second anchor 114 that the second anchor 114 detects the third anchor 116 and the fourth anchor 122). In some cases, the first anchor 112 may also respond to some of these neighbors such as the third anchor 116 (that may be above or below cluster threshold). In other cases, the first anchor 112 may not detect some of these neighbors (e.g., the fourth anchor 122). From the reported signal by the second anchor 114, the first anchor 112 may detect an obstacle between the first anchor 112 and the fourth anchor 122. In this example, the first anchor 112 may perform a room consensus process describe above. In another example, the first anchor 112 may determine that the linear distance to the fourth anchor 122 may be too large and causing the detection failure to occur. Similarly, each anchor may detect which other anchors it detected but its detected neighbors are not responding to (e.g., the second anchor 114 detects that the first anchor 112 and the fourth anchor 122 are not detecting each other. Thus, the anchors may store a list of detected anchors that includes which anchors the detected anchors also detect.

The anchors may attempt to form clusters using an open space formation process. The open space formation process may include using a similarity matrix. The anchors included in the attempt may be a group of anchors that may all detect and respond to each other, for example, anchors that have the same or similar neighbors. When formation is successful, participating neighbors may start exchanging an arbitrary cluster number. Once all participants agree on the cluster number, the anchors may determine that the cluster formation was successful.

The similarity matrix may be adjusted repeatedly when cluster formation attempts are not successful. For example, when a cluster formation attempt is not successful, each anchor may relax parameters of the similarity matrix, which may allow a stepwise percentage of disagreement between neighbors. A voting method (e.g., a Condorcet method) may be used to determine which anchor to drop first from the candidate list when attempting to form a cluster. Anchors with multiple cluster choices when determining which cluster to join may prefer the largest cluster. Attempts to form a cluster may then be repeated as above. The process may iterative and repeat until all anchors are part of a cluster.

Once multiple clusters are formed, each anchor may determine whether the anchor is an edge anchor or not. An edge anchor may be an anchor at the physical edge of the cluster it is a part of and located close to edge anchors of other clusters. The edge anchors may perform an inter-cluster synchronization process to synchronize the clocks of anchors between clusters. During the inter-cluster synchronization process, each edge anchor may attempt to become a primary anchor by signaling in its messages the count of neighboring anchors that are not part of a cluster. Thus, the edge anchors in a given cluster may form a sorted list of edge members (e.g., a sorted list from edge anchors with the largest neighbor count to edge anchors with the smallest.

During the inter-cluster synchronization process, edge anchors may also implement an optimization algorithm to synchronize their clocks. The optimization algorithm may allow anchors to listen to other anchors synchronize messages and attempt to predict the time of the next synchronization message. Next, the edge anchors may measure the mutual drift (e.g., an effective neighbor sync message time divided by a predicted message time) and adjust its prediction. Thus, the edge anchors may be able to synchronize their clocks between clusters and report the synchronization to other anchors of the cluster the edge anchors are in. Thus, clusters may synchronize their clocks together with other clusters.

The edge anchors may set a primary anchor to cause the other anchors of their cluster to synchronize their clocks with other anchors. The edge anchors may use a sorting function to determine whether they should use the synchronization proposed by an edge anchor of another cluster or to use the synchronization the edge anchor is proposing. The edge anchors may use a cluster number value indicating their cluster, a cluster member number indicating the number of anchors in their cluster, and/or a neighbor value indicating the number of neighbors of other clusters in the sorting function to determine which edge anchor should be setting the synchronization. The edge anchors of neighboring clusters may participate in the determination of which edge anchor should be the primary edge anchor that other edge anchors receive synchronization instructions from, therefore allowing clusters to align their common clock to that of the neighboring cluster with the primary edge anchor.

Figure 3:
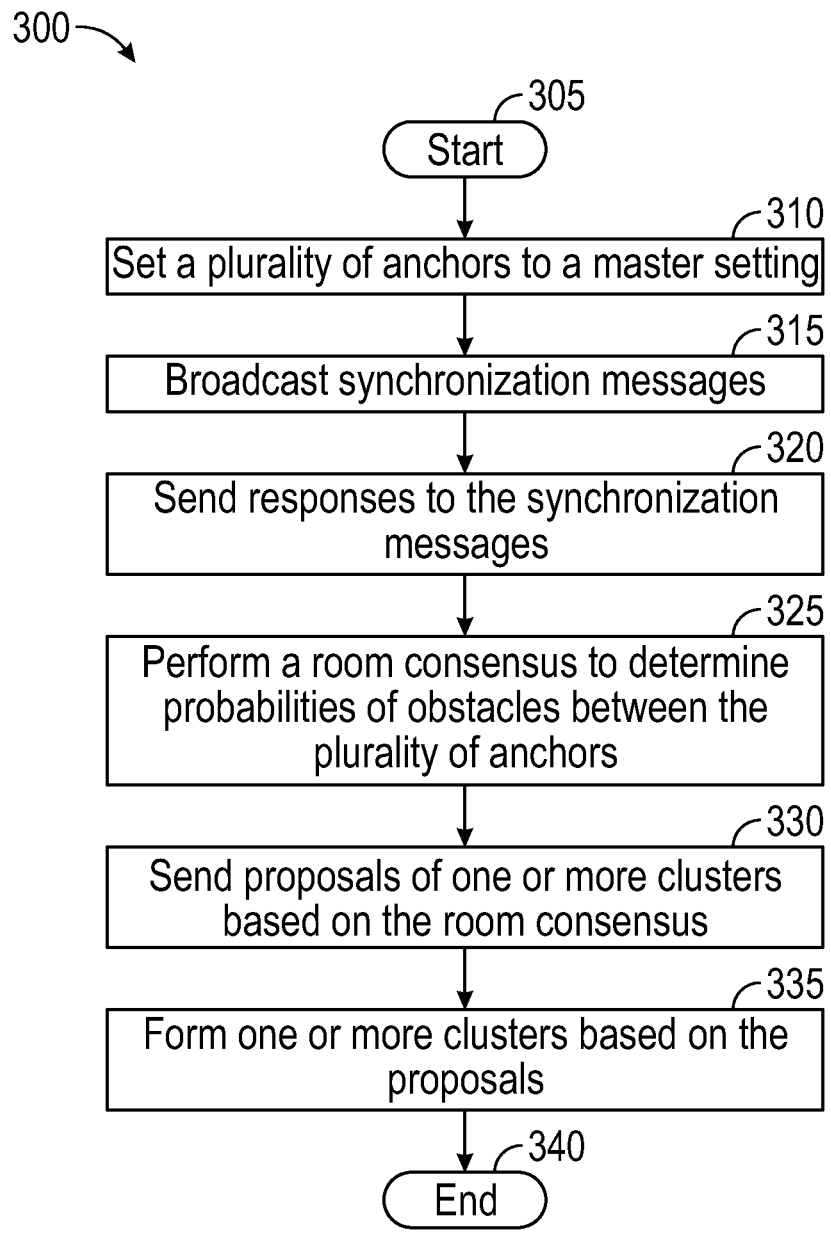
FIG. 3 is a flow chart of a method for providing cluster formation for networks in a closed space.

FIG. 3 is a flow chart of a method 300 for providing cluster formation for networks in a closed space. The method 300 may begin at starting block 305 and proceed to operation 310. In operation 310, a plurality of anchors may be set to a primary setting. For example, the first anchor 212, the second anchor 214, the third anchor 216, the fourth anchor 218, the fifth anchor 232, and the sixth anchor 234 may be set to a primary setting. Being set to the primary setting may indicate that each anchor is in its own initial cluster, and the initial cluster may be a temporary cluster for the purpose of creating and/or joining a cluster.

In operation 315, synchronization messages may be broadcast. For example, the first anchor 212, the second anchor 214, the third anchor 216, the fourth anchor 218, the fifth anchor 232, and the sixth anchor 234 may begin broadcasting synchronization messages. The synchronization messages may include a cluster index with an initial value set to indicate that the cluster is temporary.

In operation 320, responses to the synchronization messages may be sent. For example, the first anchor 212, the second anchor 214, the third anchor 216, the fourth anchor 218, the fifth anchor 232, and the sixth anchor 234 may send responses to the synchronization messages that each cluster receives. The first anchor 212, the second anchor 214, the third anchor 216, the fourth anchor 218, the fifth anchor 232, and the sixth anchor 234 may not receive each synchronization message, so the responses may only be to received synchronization messages. The responses may confirm which cluster the anchor is a member of, information related to the cluster, and the like.

In operation 325, a room consensus to determine probabilities of obstacles between the plurality of anchors may be performed. For example, the first anchor 212, the second anchor 214, the third anchor 216, the fourth anchor 218, the fifth anchor 232, and the sixth anchor 234 may perform the room consensus. The room consensus may include the steps, operations, methods, or otherwise described above with respect to FIG. 1 and FIG. 2.

In operation 330, proposals of one or more clusters based on the room consensus may be sent. For example, the first anchor 212, the second anchor 214, the third anchor 216, the fourth anchor 218, the fifth anchor 232, and the sixth anchor 234 may send proposals of one or more clusters. The proposal may be based on the determination that one or more closed spaces, second closed space 210 and third closed space 230 for example, exist because of obstacles between anchors, such as the first obstacle 220 and the second obstacle 225.

In operation 335, one or more clusters based on the proposals may be formed. For example, the first anchor 212, the second anchor 214, the third anchor 216, the fourth anchor 218, the fifth anchor 232, and the sixth anchor 234 may form two clusters. The first cluster may be the anchor in the second closed space 210 (e.g., the first anchor 212, the second anchor 214, the third anchor 216, and the fourth anchor 218). The second cluster may be the anchors in the third closed space 230 (e.g., the fifth anchor 232 and the sixth anchor 234). The method 300 may conclude at ending block 340.

Figure 4:
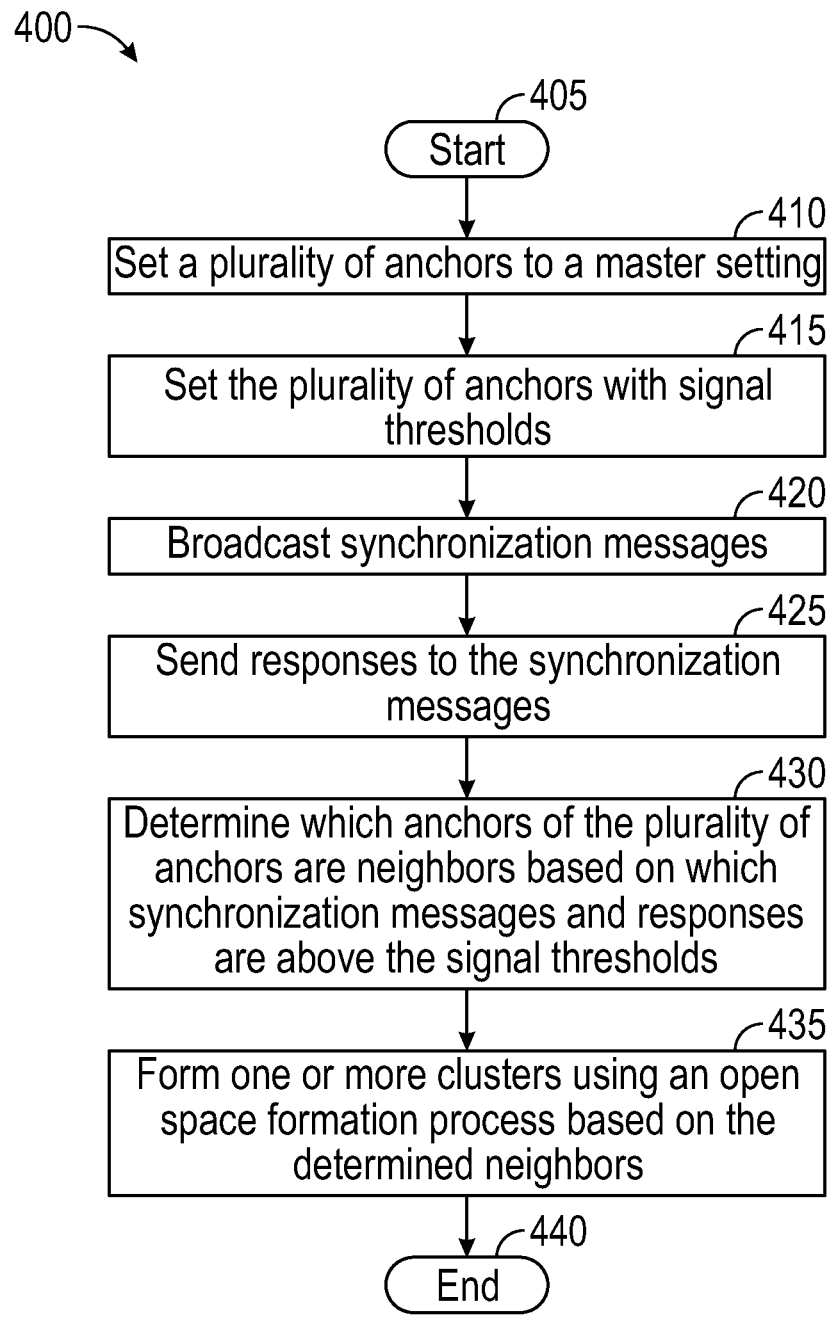
FIG. 4 is a flow chart of a method for providing cluster formation for networks in an open space.

FIG. 4 is a flow chart of a method 400 for providing cluster formation for networks in an open space. The method 400 may begin at starting block 405 and proceed to operation 410. In operation 410 set a plurality of anchors may be set to a primary setting. For example, the first anchor 112, the second anchor 114, the third anchor 116, the fourth anchor 122, the fifth anchor 124, and the sixth anchor 126 may be set to a primary setting. Being set to the primary setting may indicate that each anchor is in its own initial cluster, and the initial cluster may be a temporary cluster for the purpose of creating and/or joining a cluster.

In operation 415, the plurality of anchors may be set with signal thresholds. For example, the first anchor 112, the second anchor 114, the third anchor 116, the fourth anchor 122, the fifth anchor 124, and the sixth anchor 126 may be set with signal thresholds. The signal threshold may indicate whether an anchor should determine whether the anchor may be in a cluster with another anchor. When messages between anchors are above the threshold, the anchors may consider the respective anchor a neighbor.

In operation 420, synchronization messages may be broadcast. For example, the first anchor 112, the second anchor 114, the third anchor 116, the fourth anchor 122, the fifth anchor 124, and the sixth anchor 126 may begin broadcasting synchronization messages. The synchronization messages may include a cluster index with an initial value set to indicate that the cluster is temporary.

In operation 425, responses to the synchronization messages may be sent. For example, the first anchor 112, the second anchor 114, the third anchor 116, the fourth anchor 122, the fifth anchor 124, and the sixth anchor 126 may send responses to the synchronization messages that each cluster receives. The first anchor 112, the second anchor 114, the third anchor 116, the fourth anchor 122, the fifth anchor 124, and the sixth anchor 126 may not receive each synchronization message, so the responses may only be in response to received synchronization messages. The responses may confirm which cluster the anchor is a member of, information related to the cluster the anchor is a member of, and the like.

In operation 430, it may be determined which anchors of the plurality of anchors are neighbors based on which synchronization messages and responses are above the signal thresholds. For example, the first anchor 112, the second anchor 114, the third anchor 116, the fourth anchor 122, the fifth anchor 124, and the sixth anchor 126 may determine which anchors are neighbors based on which synchronization messages and responses are above the signal thresholds of the first anchor 112, the second anchor 114, the third anchor 116, the fourth anchor 122, the fifth anchor 124, and the sixth anchor 126.

In operation 435, one or more clusters may be formed using an open space formation process based on the determined neighbors. For example, the first anchor 112, the second anchor 114, the third anchor 116, the fourth anchor 122, the fifth anchor 124, and the sixth anchor 126 may form one or more clusters using the open space formation process based on the determined neighbors. The open space formation process may include any steps, methods, operations, or otherwise described above with respect to FIG. 1. The method 400 may conclude at ending block 440.

Figure 5:
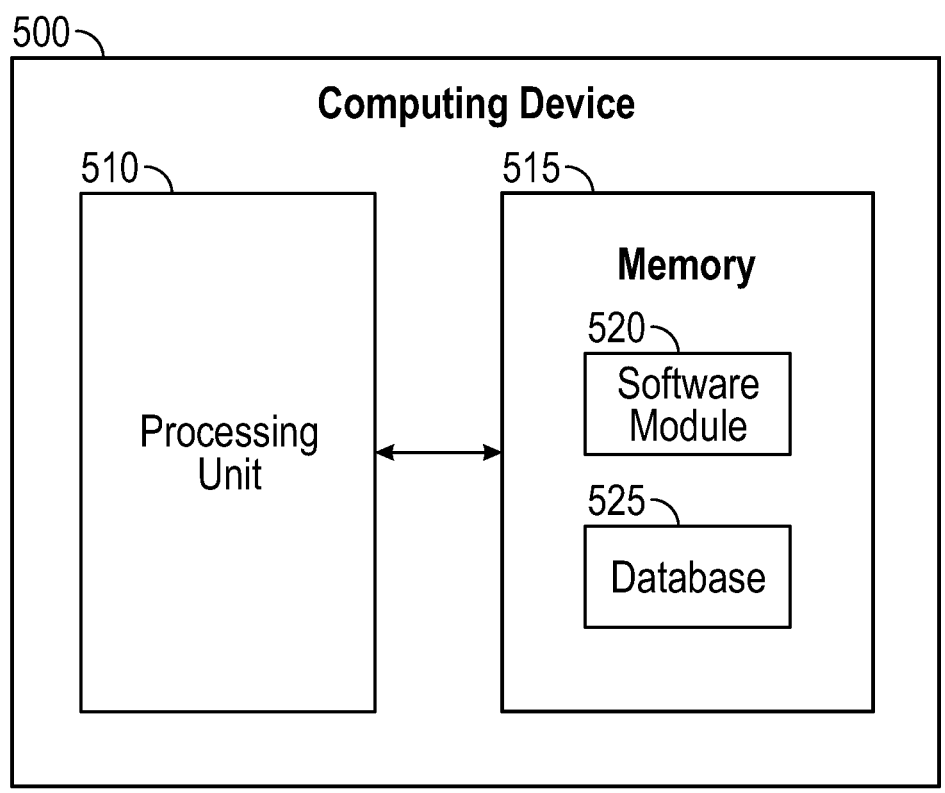
FIG. 5 is a block diagram of a computing device.

FIG. 5 is a block diagram of a computing device. As shown in FIG. 5, computing device 500 may include a processing unit 510 and a memory unit 515. Memory unit 515 may include a software module 520 and a database 525. While executing on processing unit 510, software module 520 may perform, for example, processes for providing network traffic interference detection and management as described above with respect to FIG. 1, FIG. 2, FIG. 3, and FIG. 4. Computing device 500, for example, may provide an operating environment for the first anchor 212, the second anchor 114, the third anchor 116, the fourth anchor 122, the fifth anchor 124, the sixth anchor 126, the controller 130, the locating system 135, the first anchor 212, the second anchor 214, the third anchor 216, the fourth anchor 218, the fifth anchor 232, the sixth anchor 234, the locating system 240, and/or any other system described herein. The first anchor 212, the second anchor 114, the third anchor 116, the fourth anchor 122, the fifth anchor 124, the sixth anchor 126, the controller 130, the locating system 135, the first anchor 212, the second anchor 214, the third anchor 216, the fourth anchor 218, the fifth anchor 232, the sixth anchor 234, the locating system 240, and/or any other system described herein may operate in other environments and are not limited to computing device 500.

Computing device 500 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples, and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
setting a plurality of anchors to a primary setting;
broadcasting, by the plurality of anchors, synchronization messages;

sending, by the plurality of anchors, responses to the synchronization messages;

performing, by the plurality of anchors, a room consensus to determine probabilities of obstacles between the plurality of anchors;

sending, by the plurality of anchors, proposals of one or more clusters based on the room consensus; and forming, by the plurality of anchors, one or more clusters based on the proposals, wherein:

setting the plurality of anchors to the primary setting comprises setting each anchor to an initial cluster; and the synchronization messages comprise a cluster index set to an initial value that indicates the initial clusters are temporary.

2. The method of claim 1, wherein broadcasting, by the plurality of anchors, synchronization messages and sending, by the plurality of anchors, responses to the synchronization messages is repeated based on any of (i) a probability of undetected anchors existing, (ii) an estimated number of undetected anchors, or (iii) a combination of (i) and (ii).

3. The method of claim 1, wherein the responses comprise signal strengths of the synchronization messages at reception.

4. The method of claim 3, wherein performing, by the plurality of anchors, the room consensus to determine probabilities of obstacles between the plurality of anchors is based on the signal strengths.

5. The method of claim 1, further comprising:
determining, by a locating system, positions of the plurality of anchors; and
sending, by the locating system, the positions to an STA.

6. The method of claim 5, further comprising:
determining, by the locating system, cluster memberships of the plurality of anchors;
incorporating, by the locating system, the positions on a floorplan;
determining, by the locating system, boundaries between the one or more clusters based on the positions, the floorplan, the cluster memberships; and
sending, by the locating system, the boundaries to the STA.

7. The method of claim 6, further comprising:
determining, by the STA, movement that causes the STA to move outside of a first range of a first cluster of the one or more clusters and to move inside of a second range of a second cluster of the one or more clusters; and
performing, by the STA, a location estimation based on one or more anchors of the plurality of anchors in the second cluster.

8. The method of claim 1, wherein performing, by the plurality of anchors, the room consensus to determine probabilities of obstacles between the plurality of anchors comprises performing a free path loss determination.

9. A non-transitory computer-readable medium that stores a set of instructions which when executed perform a method executed by the set of instructions comprising:
setting a plurality of anchors to a primary setting;
broadcasting, by the plurality of anchors, synchronization messages;
sending, by the plurality of anchors, responses to the synchronization messages;
performing, by the plurality of anchors, a room consensus to determine probabilities of obstacles between the plurality of anchors;

sending, by the plurality of anchors, proposals of one or more clusters based on the room consensus; and forming, by the plurality of anchors, one or more clusters based on the proposals, wherein performing, by the plurality of anchors, the room consensus to determine probabilities of obstacles between the plurality of anchors comprises performing a free path loss determination.

10. The non-transitory computer-readable medium of claim 9, wherein:
setting the plurality of anchors to the primary setting comprises setting each anchor to an initial cluster; and
the synchronization messages comprise a cluster index set to an initial value that indicates the initial clusters are temporary.

11. The non-transitory computer-readable medium of claim 9, wherein broadcasting, by the plurality of anchors, synchronization messages and sending, by the plurality of anchors, responses to the synchronization messages is repeated based on any of (i) a probability of undetected anchors existing, (ii) an estimated number of undetected anchors, or (iii) a combination of (i) and (ii).

12. The non-transitory computer-readable medium of claim 9, wherein the responses comprise signal strengths of the synchronization messages at reception.

13. The non-transitory computer-readable medium of claim 12, wherein performing, by the plurality of anchors, the room consensus to determine probabilities of obstacles between the plurality of anchors is based on the signal strengths.

14. The non-transitory computer-readable medium of claim 9, further comprising:
determining, by a locating system, positions of the plurality of anchors; and
sending, by the locating system, the positions to an STA.

15. The non-transitory computer-readable medium of claim 14, further comprising:
determining, by the locating system, cluster memberships of the plurality of anchors;
incorporating, by the locating system, the positions on a floorplan;
determining, by the locating system, boundaries between the one or more clusters based on the positions, the floorplan, the cluster memberships; and
sending, by the locating system, the boundaries to the STA.

16. The non-transitory computer-readable medium of claim 15, further comprising:
determining, by the STA, movement that causes the STA to move outside of a first range of a first cluster of the one or more clusters and to move inside of a second range of a second cluster of the one or more clusters; and
performing, by the STA, a location estimation based on one or more anchors of the plurality of anchors in the second cluster.

17. A method comprising:
setting a plurality of anchors to a primary setting;
broadcasting, by the plurality of anchors, synchronization messages;
sending, by the plurality of anchors, responses to the synchronization messages;
performing, by the plurality of anchors, a room consensus to determine probabilities of obstacles between the plurality of anchors;
sending, by the plurality of anchors, proposals of one or more clusters based on the room consensus; and forming, by the plurality of anchors, one or more clusters based on the proposals, wherein broadcasting, by the plurality of anchors, synchronization messages and sending, by the plurality of anchors, responses to the synchronization messages is repeated based on any of (i) a probability of undetected anchors existing, (ii) an estimated number of undetected anchors, or (iii) a combination of (i) and (ii).

18. The method of claim 17, wherein:

setting the plurality of anchors to the primary setting comprises setting each anchor to an initial cluster; and the synchronization messages comprise a cluster index set to an initial value that indicates the initial clusters are temporary.

19. The method of claim 17, wherein the responses comprise signal strengths of the synchronization messages at reception.

20. The method of claim 19, wherein performing, by the plurality of anchors, the room consensus to determine probabilities of obstacles between the plurality of anchors is based on the signal strengths.

* * * * *